(12) United States Patent
Gunji

(10) Patent No.: US 7,461,133 B2
(45) Date of Patent: Dec. 2, 2008

(54) SYSTEM OF AUTOMATICALLY FETCHING CONTENTS PRESENT ON NETWORK

(75) Inventor: Nobuhiro Gunji, Nagano-ken (JP)

(73) Assignee: Sieko Epson Corporation, Tokyo (JP)

( * ) Notice: Subject to any disclaimer, the term of this patent is extended or adjusted under 35 U.S.C. 154(b) by 619 days.

(21) Appl. No.: 09/969,551

(22) Filed: Oct. 1, 2001

(65) Prior Publication Data

US 2003/0065755 A1   Apr. 3, 2003

(51) Int. Cl.
*G06F 15/16* (2006.01)
*G06F 17/00* (2006.01)
*G06F 15/173* (2006.01)

(52) U.S. Cl. .................. 709/217; 709/203; 715/234

(58) Field of Classification Search ................. 709/203, 709/221, 223, 224, 217; 715/513
See application file for complete search history.

(56) References Cited

U.S. PATENT DOCUMENTS

| 5,155,847 | A | * | 10/1992 | Kirouac et al. | 709/221 |
|---|---|---|---|---|---|
| 5,421,009 | A | * | 5/1995 | Platt | 709/221 |
| 5,473,772 | A | * | 12/1995 | Halliwell et al. | 717/171 |
| 5,586,304 | A | * | 12/1996 | Stupek et al. | 717/170 |
| 5,742,829 | A | * | 4/1998 | Davis et al. | 717/178 |
| 5,752,042 | A | * | 5/1998 | Cole et al. | 717/173 |
| 5,845,077 | A | * | 12/1998 | Fawcett | 709/221 |
| 5,860,012 | A | * | 1/1999 | Luu | 717/175 |
| 5,881,236 | A | * | 3/1999 | Dickey | 709/221 |
| 5,919,247 | A | * | 7/1999 | Van Hoff et al. | 709/217 |
| 6,023,585 | A | * | 2/2000 | Perlman et al. | 717/178 |
| 6,047,129 | A | * | 4/2000 | Frye | 717/172 |
| 6,049,671 | A | * | 4/2000 | Slivka et al. | 717/173 |
| 6,052,198 | A | * | 4/2000 | Neuhard et al. | 358/1.15 |
| 6,052,531 | A | * | 4/2000 | Waldin et al. | 717/170 |
| 6,094,679 | A | * | 7/2000 | Teng et al. | 709/220 |
| 6,119,204 | A | * | 9/2000 | Chang et al. | 711/141 |
| 6,151,708 | A | * | 11/2000 | Pedrizetti et al. | 717/173 |
| 6,256,668 | B1 | * | 7/2001 | Slivka et al. | 709/220 |
| 6,502,185 | B1 | * | 12/2002 | Keller et al. | 712/213 |

(Continued)

FOREIGN PATENT DOCUMENTS

JP          11-296456           10/1999

(Continued)

OTHER PUBLICATIONS

Howe, Denis. "Extensible Markup Language", publicly posted Nov. 20, 1997, <http://foldoc.org/?Extensible+Markup+Language>, 1 page.*

*Primary Examiner*—George C Neurauter, Jr.
(74) *Attorney, Agent, or Firm*—Beyer Law Group LLP

(57) ABSTRACT

The object of the present invention is to facilitate collection of contents that are present on a network.

Attribute information is stored at a predetermined location under a domain in a server that provides a device driver. The attribute information specifies attributes of the driver provided by the server, such as the address, the corresponding type, the version, the installation method, and the platform, in an XML format. The user of the driver fetches the attribute information from a computer connecting with the network and analyzes the details of the attribute information, so as to readily specify the address of the driver, irrespective of the construction of the server. The attribute information also shows whether or not the driver has been updated. This arrangement facilitates automatic acquisition of the updated driver.

12 Claims, 8 Drawing Sheets

U.S. PATENT DOCUMENTS

| | | | | |
|---|---|---|---|---|
| 6,574,657 | B1* | 6/2003 | Dickinson | 709/203 |
| 6,631,407 | B1* | 10/2003 | Mukaiyama et al. | 709/223 |
| 6,651,249 | B2* | 11/2003 | Waldin et al. | 717/170 |
| 6,779,004 | B1* | 8/2004 | Zintel | 709/227 |
| 6,882,439 | B2* | 4/2005 | Ishijima | 358/1.15 |
| 6,910,068 | B2* | 6/2005 | Zintel et al. | 709/220 |
| 2002/0065872 | A1* | 5/2002 | Genske et al. | 709/202 |
| 2002/0065950 | A1* | 5/2002 | Katz et al. | 709/318 |
| 2004/0098515 | A1* | 5/2004 | Rezvani et al. | 709/400 |

FOREIGN PATENT DOCUMENTS

| | | |
|---|---|---|
| JP | 2001-273251 | 5/2001 |

* cited by examiner

SYSTEM OF AUTOMATICALLY FETCHING CONTENTS PRESENT ON NETWORK

FIELD OF THE INVENTION

The present invention relates to a system of automatically collecting a diversity of electronic contents from a server connecting with a network.

DESCRIPTION OF THE RELATED ART

With wide spread of LAN (Local Area Network), multiple computers connecting with a network share one or multiple printers connecting with the network. The user selects a printer as an output resource from a computer connecting with the network and transmits a desired print job to the selected printer to implement printing via the network.

In order to implement printing, a printer driver corresponding to a printer specified as the output resource should be installed in each client computer. The user of each client installs the printer driver from a medium like a flexible disk or a CD-ROM or downloads and installs the printer driver stored in a predetermined management system connecting with the network.

There are a number of printer driver programs according to the type of the printer, the operating system, the language, and the version. It is thus required for the user to select an appropriate printer driver for installation. In many cases, the printer driver program of a later version than the version of the program stored in a medium packed with the printer main body is provided in a predetermined Web site on the Internet. It is thus desirable to fetch the update information of the printer driver and acquire the printer driver of the up-to-date version. There is, however, difficulty for the general users in adequately installing the printer driver by taking into account such situations. In the network connecting with a large number of clients, a specific manager stores an optimum printer driver in the management system. The user downloads and installs the printer driver stored in the management system.

When the printer driver adequate for the working environment and the printer model is stored in a predetermined management system, the manager who manages the network updates the printer driver to the latest version. This is convenient for the general users since the user can install the printer driver without checking whether or not the printer driver is an old version or a new version. The manager is, on the other hand, required to continually monitor the updating status of the printer driver. This undesirably increases the load of management.

The printer driver is generally provided on a site of a manufacturer of a corresponding printer. There is no standard in the structure of the Web page for supplying the printer driver, and the respective manufactures may adopt different structures. The structure of the Web page even by one manufacturer may be modified or changed. The location of the server that supplies the printer driver, that is, a URL (Uniform Resource Locator), may be transferred on the network. Monitoring the updating status of the printer driver of each manufacturer under such circumstances is a heavy load for the manager. There is also possibility that the provider of the printer driver can not adequately give the update information of the driver to the users.

The above description regards the update of the printer driver. Similar programs arise in the process of collecting electronic contents, such as programs and data, supplied via the network. These problems are not restricted to the Internet but are also found in the process of collecting contents on an inside network or an Intranet.

SUMMARY OF THE INVENTION

Means for Solving the Problems and their Functions and Effects

The object of the present invention is to solve the problems discussed above and to provide a technique of enhancing the efficiency of collection and supply of electronic contents via a network.

At least part of the above and the other related objects is attained by a support system that assists a client connecting with a network to collect a predetermined content via the network. The support system has an attribute information providing module that is present at a known location to the client on the network and provides attribute information, which includes information regarding an address of the content on the network and a utilization method of the content.

In the support system of the present invention, the client gains access to the attribute information providing module that is present at a known location and is thereby informed of the address of the required content on the network. Even when the content is provided in a Web site having an unknown structure, this arrangement ensures a desired content to be readily acquired. When the structure of the Web site that provides the content is changed or when any content is added or deleted, information representing such a change is collectively given as part of the attribute information. This arrangement thus ensures easy acquisition of a desired content. The advantage for the content provider is to ensure the utilization by simply updating the attribute information simultaneously with update of the Web site. The support system of the present invention is thus advantageous for both the provider and the user to accelerate the utilization of the content.

The attribute information specifies the address of the content, like a link page that is related to addresses of various contents on the Web site. The difference from the link page is that the attribute information is not restricted to the address but includes additional pieces of information. The attribute information includes information with regard to the utilization method of the content. The client can thus readily utilize any of diverse contents that follow different formats. The greater pieces of attribute information enhances the convenience of the client in the process of collecting contents. The technique of the present invention is not restricted to the Web site but is applicable to diverse systems that provide contents via the network.

The attribute information may be specified in various forms. It is desirable that the attribute information is described in an SGML (Standard Generalized Markup Language) with a tag. The client can readily analyze the attribute information described in this language. Examples of such language include HTML (Hyper Text Markup Language) and XML (extensible Markup Language). The use of XML is especially preferable because of flexibility in describing the attribute information.

The attribute information may include attribute description data that utilizes the tag to describe an attribute and tag definition data that defines details of the tag used for the description. For example, when XML is selected, an XML file that directly describes the attribute information and a DTD (Document Type Definition) that describes definition of the tag used in the XML file are specified as the attribute information.

The technique of the present invention is applicable to diverse contents. For example, the content may be a driver program of a certain device. The driver program of the device is updated at relatively frequent cycles. The support system of the above application readily monitors the updating status of the driver program and acquires the driver program of the latest version. The contents may include firmware of various devices other than the driver programs, as well as diverse application programs. The contents are not restricted to the software but may be data of letters and images, for example, a help file. When the support system is present in an inside network or an Intranet, the contents may be inside software packages, technical documents, and manuals.

In many cases, there are multiple attribute information providing modules, since the content provider itself generally has the attribute information providing module. When there are multiple attribute information providing modules, the location of each attribute information providing module may be given as an absolute address on the network, for example, a URL. It is, however, preferable that the known location is defined by a relative path to an address of a page located on an upper most hierarchical level among a set of Web pages supplied by a provider of the content. Respective content providers have different pieces of information with regard to the directory name and the domain name in the Web site that specify the location of the attribute information providing module on the upper most level, whereas information for specifying the location on the lower hierarchical level is fixed. Definition of the location in this manner informs the client of the location of the attribute information providing module with regard to each content provider. This enhances the convenience of the client.

In another preferable application of the support system, the attribute information includes new address information for specifying a new address of the attribute information providing module and instruction information that instructs replacement of data in the client with regard to the location of the attribute information providing module with the new address information.

This arrangement enables the client that accesses the attribute information providing module to automatically update the existing data of the location to the new address information and gain access to the transferred attribute information providing module after the update. This ensures the access to the transferred attribute information providing module without specifically notifying all the clients of the new address. This facilitates the transfer of the attribute information providing module.

The present invention is not restricted to the support system discussed above, but is also applicable to a content collection system. This application corresponds to the client that utilizes the above support system and is in combination with the support system.

The present invention is accordingly directed to an information collection system that collects a predetermined electronic content from a server connecting with a network. The information collection system includes: an attribute information fetching module that fetches attribute information, which includes information regarding an address of the predetermined content on the network and a utilization method of the content, from an attribute information server that is present at a known location on the network; an address specification module that analyzes the attribute information and specifies the address of the predetermined content; and a collection module that gains access to the specified address and thereby collects the predetermined content.

The information collection system automatically collects the content based on the attribute information. This arrangement facilitates collection of a content even when the location of the content is not definitely specified or when there is a possibility that the location of the content is changed by a content provider.

The advantage of the information collection system of the present invention is to readily monitor the update of the content. The user of the information collection system may regularly access the server and monitor the updating status of the content. In one preferable application, however, the information collection system of the present invention includes an updating module that activates the collection module to collect the predetermined content, when a specified condition with regard to update of the server that provides the predetermined content is fulfilled.

This arrangement enables the information of the updated content to be automatically collected and thereby significantly relieves the load of monitoring the updating status. A diversity of settings may be allowed for the predetermined condition with regard to the update. For example, the predetermined condition may be elapse of a preset time period for a certain content that is known to be regularly updated. In another example, the attribute information may include information with regard to the update of the content, and the process may determine whether or not the content has been updated based on the attribute information.

The application of providing the new address information in the support system is described above. In a similar manner, it is preferable that the information collection system of the present invention includes a replacement module that, when the attribute information includes new address information for specifying a new address of the attribute information server and instruction information that instructs replacement of client's data with regard to the location of the attribute information server with the new address information, replaces data with regard to the location of the attribute information server with the new address information based on the attribute information. In the case of the transfer of the attribute information server, this arrangement enables information with regard to the location of the transferred attribute information server to be automatically updated as the new address information. This ensures smooth collection of contents even after the transfer.

In accordance with another preferable application, the information collection system further has: a storage module that stores the collected content; and a distribution module that receives a requirement from a client connecting with the network and distributes a corresponding content to the client in response to the requirement.

This arrangement ensures total management of contents in the information collection system and enables a client connecting with a LAN including the information collection system to readily utilize the managed contents.

In the information collection system of the above application, the content is a driver program of a predetermined device, the attribute information includes information regarding an installation method of the driver program, and the distribution module installs the driver program into the client connecting with the network according to the installation method. It is generally required to specify the corresponding type, the version, and the operating system prior to installation of an adequate device driver. The above arrangement facilitates installation of the adequate driver according to the working environments.

The technique of the present invention is not restricted to the applications discussed above, but may be actualized by a diversity of other applications. One possible application is a support method that assists the client to access the content. Another possible application is a method of collecting a predetermined electronic content from a server connecting with a network. In the case where the content is a device driver, the present invention may be directed to an installation method including installation into a client.

Other applications of the present invention include a program for actualizing the functions discussed above, a signal form equivalent to such a program, and a recording medium in which such a program is recorded. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

DESCRIPTION OF THE PREFERRED EMBODIMENTS

Figure 1:
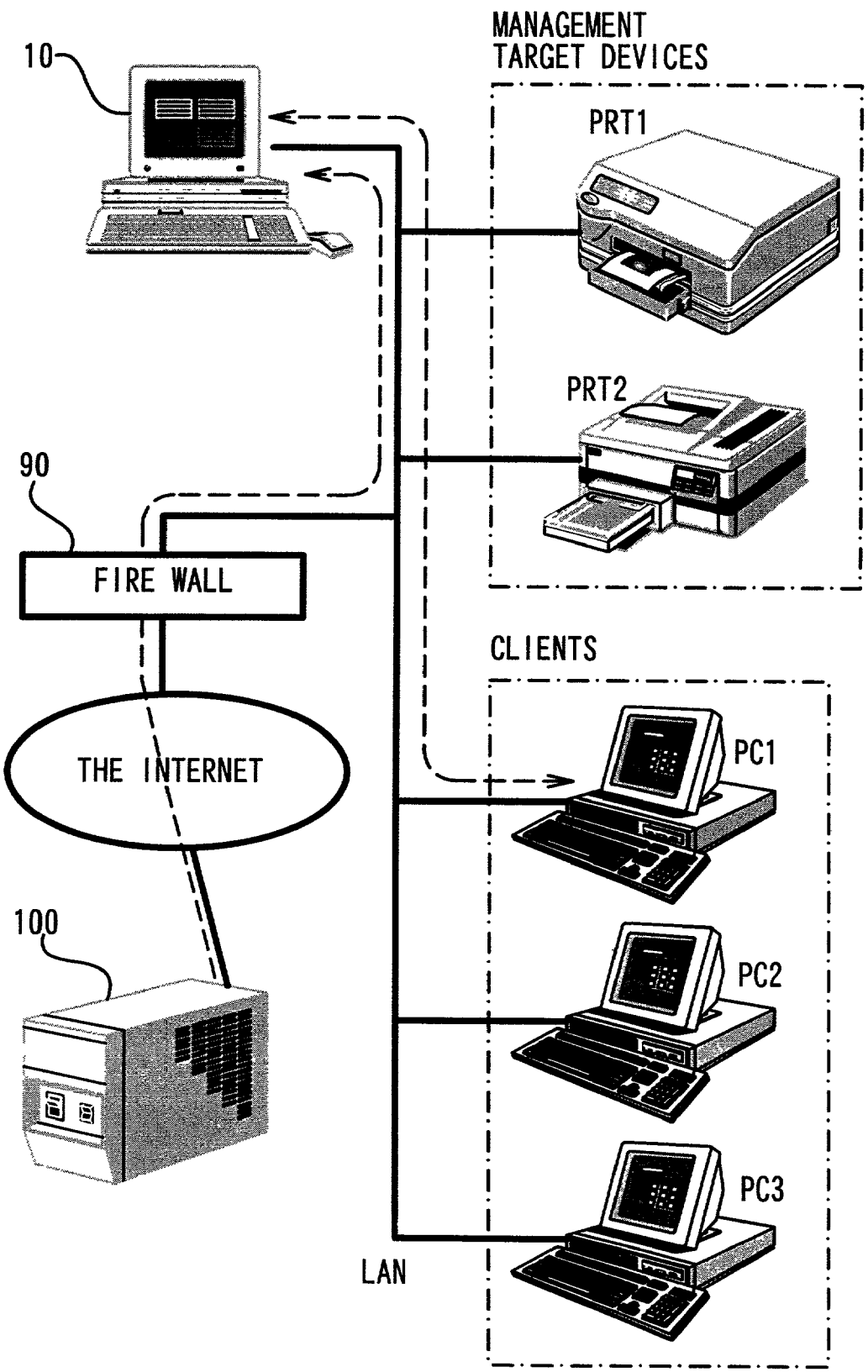
FIG. 1 schematically illustrates the construction of a system in one embodiment.

Some embodiments of the present invention are discussed below in the following sequence:
A. Construction of System
B. Configuration of Management System
C. Configuration of Web Server
D. Attribute Information
E. Driver Acquisition Process
F. Driver distribution Process
G. Second Embodiment
H. Modifications A. Construction of System FIG. 1 schematically illustrates the construction of a system in one embodiment. In this embodiment, a management system 10, management target devices, and clients are mutually connected via a network LAN. Printers PRT1 and PRT2 are illustrated examples of the management target devices. Three computers PC1, PC2, and PC3 are illustrated examples of the clients. The system may include a greater number of management target devices and clients. The network LAN is connected to the external Internet via a fire wall 90 and further to a Web server 100 connecting with the Internet.

Each of the clients PC1 to PC3 specifies an output resource and transmits a print job to the network LAN, so as to carry out a printing operation with either of the printers PRT1 and PRT2. Printer drivers suitable for the printers PRT1 and PRT2 should be installed in each client for the printing operations. The printer drivers are stored in the management system 10. The user of each of the clients PC1 to PC3 gains access to the management system 10 and installs the printer drivers according to the requirements as shown by the broken arrow.

The management system 10 stores a set of printer drivers required on the network LAN and supplies the desired printer drivers in response to requirements from the clients PC1 to PC3. In this embodiment, each supplied printer driver is installed automatically.

The printer drivers are provided by the manufacturers of the respective printers PRT1 and PRT2 and are generally subjected to iterative version-up. The version-up printer driver is supplied via the Internet by the Web server 100. The management system 10 regularly monitors the Web server 100 and fetches and holds the printer driver of the latest version. As discussed later, information for supporting fetch of the printer driver by the management system 10 is stored in the Web server 100. The management system 10 corresponds to the information collection system of the present invention. The Web server 100 corresponds to the support system of the present invention.

B. Configuration of Management System

Figure 2:
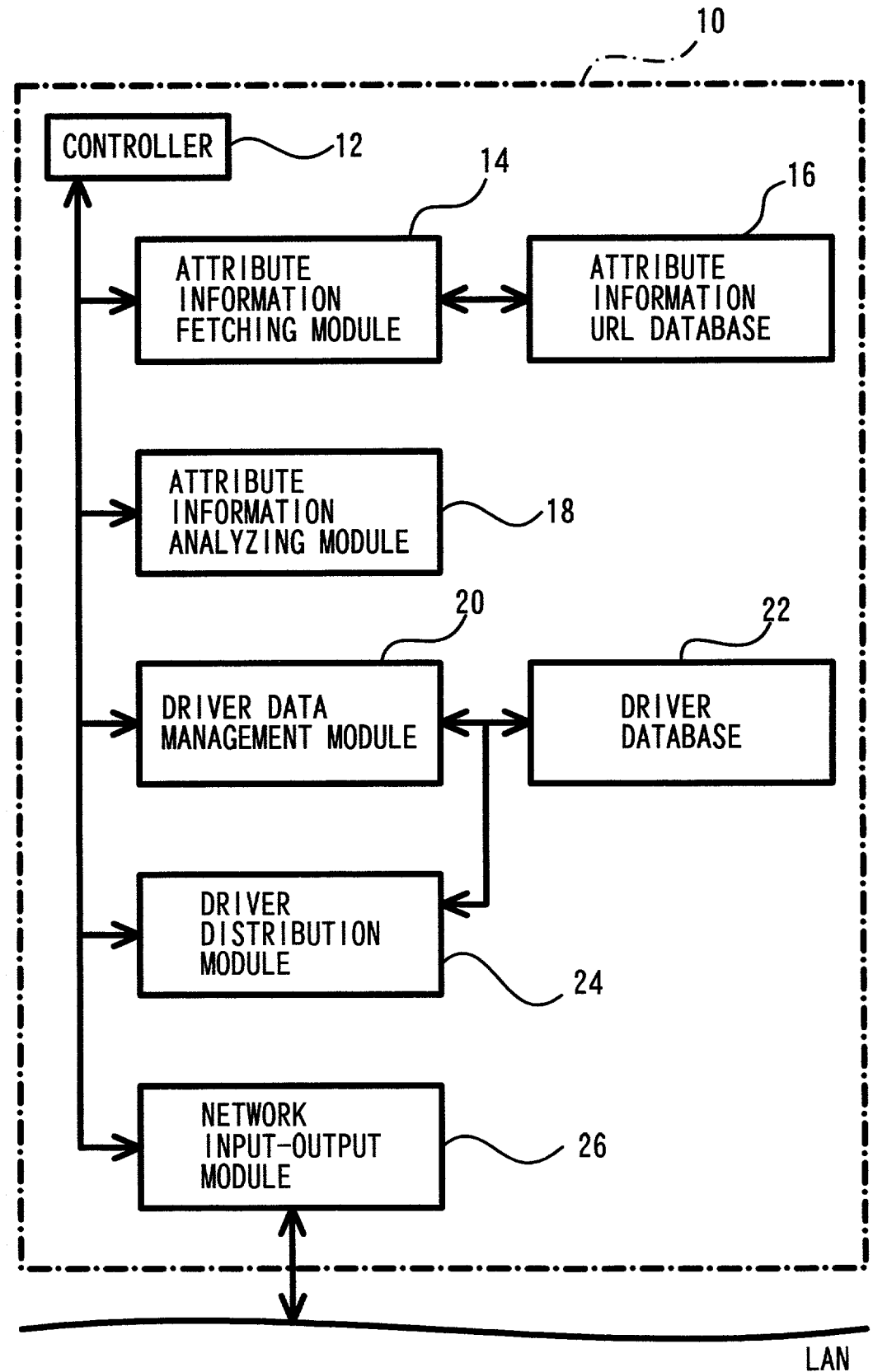
FIG. 2 shows functional blocks of a management system 10.

FIG. 2 shows functional blocks of the management system 10. In this embodiment, the management system 10 is actualized by the software configuration by utilizing a general-purpose computer. The respective functional blocks shown in FIG. 2 are accordingly attained by the software. The following description regards the arrangement constructed in one computer, although the functions may be attained by multiple computers working in cooperation.

As illustrated, the management system 10 includes a controller 12 that controls all the functional blocks. An attribute information fetching module 14, an attribute information analyzing module 18, a driver data management module 20, a driver distribution module 24, and a network input-output module 26 are provided as modules functioning under the control of the controller 12. An attribute information URL database 16 and a driver database 22 are provided as databases used by these functional blocks. The attribute information URL database 16 is referred to by the attribute information fetching module 14. The driver database 22 is read and written respectively by the driver data management module 20 and the driver distribution module 24.

The functions of the respective functional blocks are discussed below. The attribute information fetching module 14 functions to gain access to the Web server 100 and fetch attribute information regarding the printer driver supplied from the Web server 100. The location of the attribute information is stored in the attribute information URL database 16. The structure of this embodiment includes only one Web server 100, so that one URL is stored in the attribute information URL database 16. When there is requirement to access multiple Web servers, for example, in the case where the management target devices include multiple printers of different manufacturers, URLs corresponding to the number of Web servers to be accessed are stored in the attribute information URL database 16. In this embodiment, the attribute information described in XML is given by the Web server 100. XML is a language included in the SGML series and described with tags. Information DTD that defines the details of the tags is required for analyzing the attribute information described in XML. The attribute information fetching module 14 fetches both an attribute information file described in XML and DTD from the Web server 100.

The attribute information analyzing module 18 functions to analyze the attribute information fetched by the attribute information fetching module 14. More specifically, the attribute information analyzing module 18 analyzes the attribute information described in XML by referring to the definition in DTD. The attribute information includes information regarding the location or address of the printer driver on the network, the information regarding the compatible types and the version of the printer driver, and information regarding the utilization method or the installation method of the printer driver.

The driver data management module 20 functions to obtain the printer driver of the latest version from the Web server 100. In a concrete procedure, the driver data management module 20 fetches the attribute information of the printer driver from the attribute information analyzing module 18. When the fetched attribute information shows that there is the printer driver of a later version than the version of the printer driver managed by the driver database 22, the driver data management module 20 accesses the location specified by the attribute information and downloads the up-to-date printer driver. The printer thus obtained is stored in the driver database 22.

The driver distribution module 24 functions to supply printer drivers to the clients PC1 to PC3. In a concrete procedure, the driver distribution module 24 receives a requirement from each of these clients, retrieves the driver database 22 to find a printer driver adequate for the requirement, and transmits the retrieved printer driver to the client. In response to supply of the printer driver to the client, the driver distribution module 24 triggers execution of a predetermined execution format file specified by the installation method included in the attribute information and installs the printer driver into the client.

The network input-output module 26 functions as an interface that allows transmission of information between the respective functional blocks and the outside via the network LAN. Transmission of information via the network LAN is generally actualized by transmission of packets created in formats following diverse communication protocols. The network input-output module 26 converts the information output from the management system 10 into packets in a format adapted in a selected communication protocol. The network input-output module 26 also analyzes each packet input from the network LAN and extracts the real substance of the transmitted information.

C. Configuration of Web Server

Figure 3:
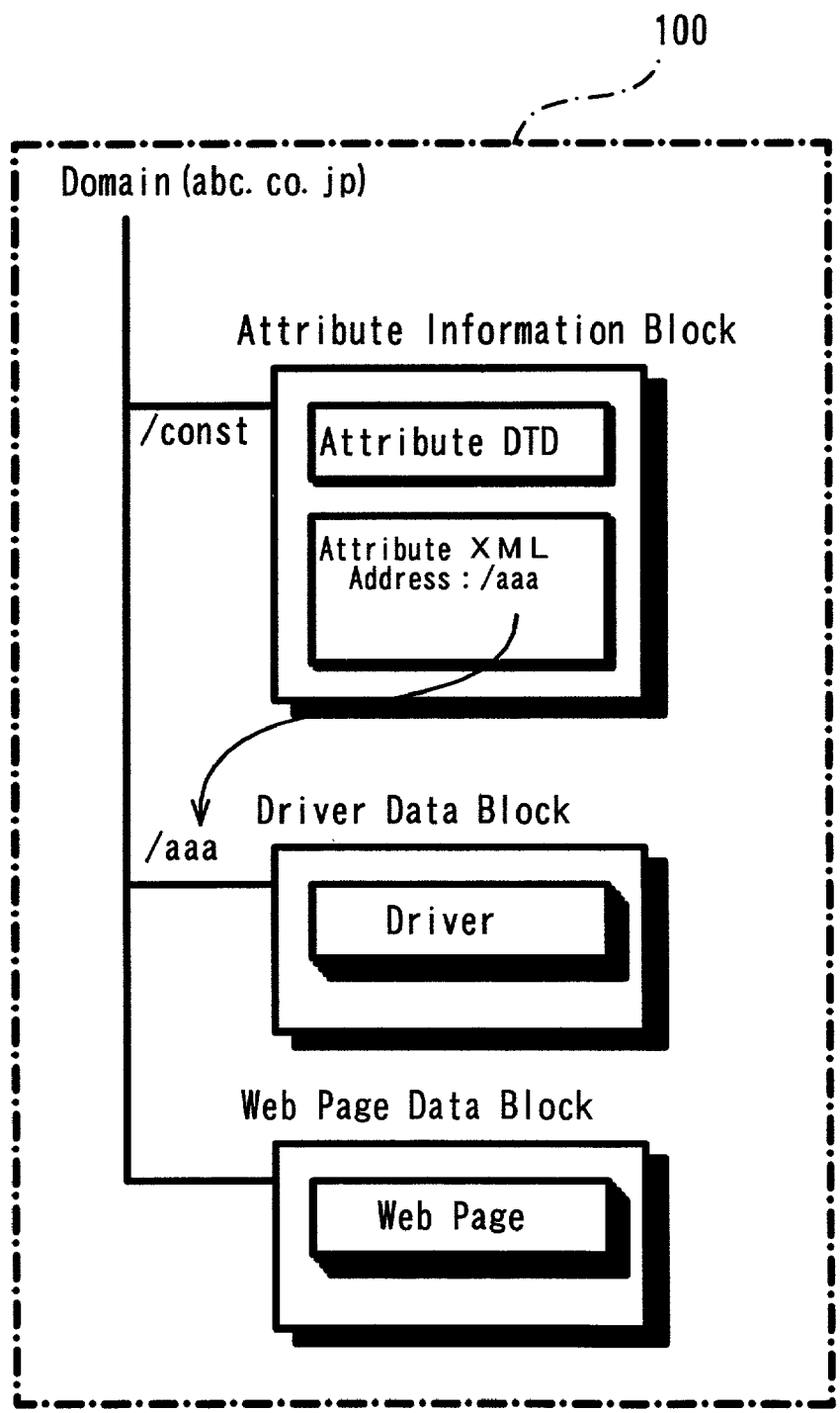
FIG. 3 shows a data structure stored in a Web server 100.

The following describes the internal structure of the Web server 100 that supplies the printer driver to the management system 10. FIG. 3 shows the data structure stored in the Web server 100. The location of the Web server 100 on the Internet is generally specified by the URL. In the description below, as a matter of convenience, the Web server 100 that supplies the printer driver has the domain name 'abc.co.jp'. In this case, the URL of an upper-most hierarchical level Web page or a home page provided by the Web server 100 is specified as 'http://www.abc.co.jp/'. This is just an example, and the part 'http://www.' depends upon by the communication protocol and the host name.

A Web page data block for providing data for display of a Web page, a driver data block for storing the real substance of the printer driver, and an attribute information block for providing the attribute information of the printer driver to be supplied are stored in the Web server 100. These blocks represent divisions of data stored in the Web server 100 for convenience of explanation, and may not be stored in an integral storage area in the Web server 100.

The driver data block and the Web page data block stored in the Web server 100 are data created in any arbitrary path and structure by the provider of the Web server 100, that is, a printer manufacture in this embodiment. The attribute information block is created in a predetermined format and a specific format preset based on the relation to the management system 10. In this embodiment, the path of the attribute information block is set in advance, based on the relation to the domain name. In the illustrated example of FIG. 3, the attribute information block is present in a specific path '/const' under the domain name. The URL for accessing the attribute information block is thus 'http://www.abc.co.jp/const'.

The structure of this embodiment includes only one Web server 100. In the case where the printers used on the network are manufactured by a plurality of different makers, it is required to download printer drivers from a plurality of Web servers. The arrangement of providing the attribute information at a certain location having a fixed path relative to the domain name, that is, at a fixed location in a lower hierarchical level under the home page, advantageously enables the location of the attribute information to be readily found even in Web servers provided by different makers. For example, it is assumed that a Web server provided by a certain maker has the domain 'xyz.co.jp'. Since the attribute information is present in a path specified by '/const' under the domain, the URL for access to the attribute information is 'http://www.xyz.co.jp/const'. The management system 10 readily gains access to the attribute information of the respective Web servers by simply replacing the domain name. The attribute information is created and supplied by the provider of the printer driver. In the actual service of the system of the embodiment, an advanced agreement with the provider of the printer driver is required with regard to the location of the attribute information.

The relative path under the domain in which the attribute information is stored can be set arbitrarily. The attribute information may be set in a proper path for each Web server, although the above advantage is lost. The only requirement here is to explicitly inform the management system 10 of the location of the attribute information. In this embodiment, the attribute information is stored inside the Web server 100. As long as the management system 10 is explicitly informed of the location of the attribute information, the attribute information may be stored in a server other than the Web server 100.

In this embodiment, the attribute information block includes two different types of data. One type is an attribute XML file that describes the attribute information in XML. The other type is an attribute DTD file used for analysis of XML. The relationship between these two files will be discussed later.

As shown in FIG. 3, the attribute XML file includes location data representing the location of the printer driver stored in the Web server 100. In the illustrated example, the location of the printer driver is specified by a relative path '/aaa' under the domain. As discussed previously, the driver data block and the Web page data block are provided in diverse ways, that is, at arbitrary locations and in arbitrary formats, in the Web server 100. The management system 10, which is just one user of the Web server 100, can thus not sufficiently grasp such data blocks. The location and the format depends upon each maker, and it is difficult to set any uniform criterion.

The attribute information blocks are, on the other hand, provided in a certain area that can be grasped by the manager. The management system 10 accesses the attribute information and analyzes the details of the attribute information to specify the location of the printer driver in the Web server 100. This enables the printer driver to be readily downloaded even when the configuration of the Web server 100 is set by each maker. The attribute information block ensures the flexibility in structure of the Web page for the provider of the printer driver, while exerting the mediation function to readily inform the user of the printer driver of the location of the printer driver and other required information.

In the illustrated example of FIG. 3, the location of the printer driver is specified by the relative pass '/aaa' under the domain. The location may be specified by an absolute address on the network, for example, a URL. When the information on the location of the printer driver is provided in this application, the attribute information block may be present in another domain different from the domain of the driver data block.

D. Attribute Information

Figure 4:
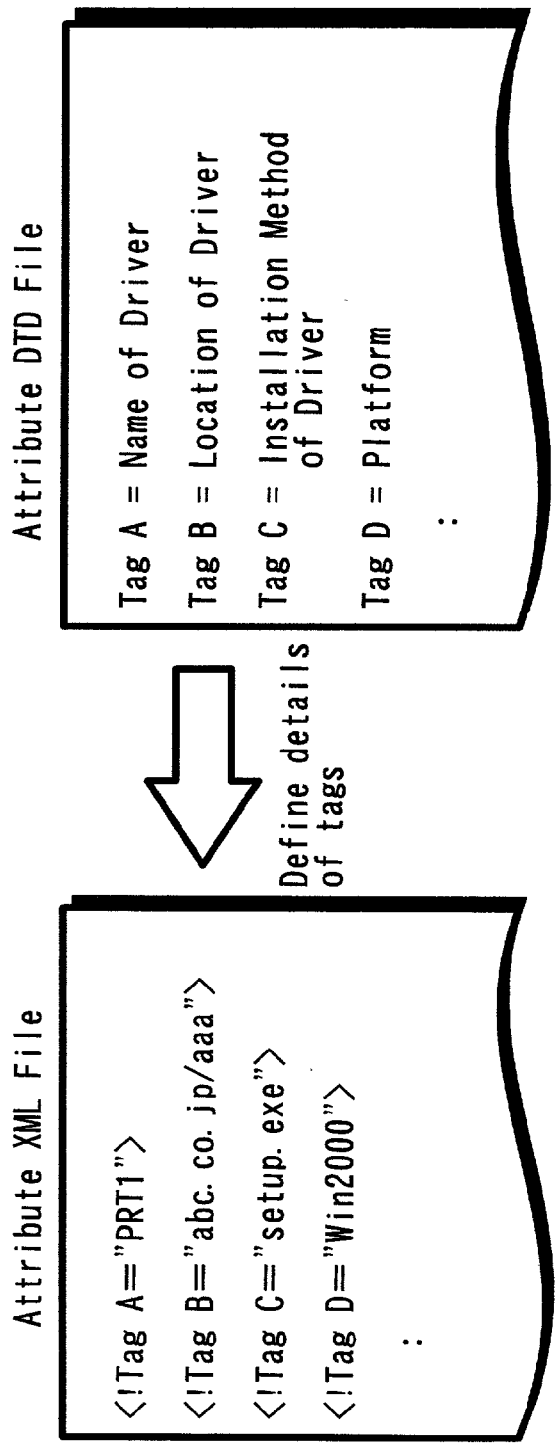
FIG. 4 shows details of an attribute information block.

The detailed structure of the attribute information is discussed below. FIG. 4 shows the details of the attribute information block. As mentioned previously, the attribute information includes the attribute XML file and the attribute DTD file. The attribute XML file describes the attribute information in the XML format. As schematically illustrated in FIG. 4, in the XML file, the attribute information is described with identifiers called tags that are surrounded by symbols '<' and '>'. The tags used in the XML file are arbitrarily set, and the details of the tags are defined by the DTD file.

For example, as schematically illustrated in FIG. 4, DTD defines the details of the tags like 'Tag A represents the name of the driver', 'Tab B represents the location of the driver', 'Tag C represents the installation method of the driver', and 'Tag D represents the platform using the driver, that is, the type of the operating system'. Creation of the XML file with the tags thus defined enables the attribute information of the printer driver to be described easily and accurately.

In this embodiment, the attribute information is described in XML, because of the advantageous flexibility of tags. The attribute information is, however, not restricted to this format but may be described in HTML that also uses tags. Another applicable method does not use the tags but enumerates attribute information in a predetermined format.

E. Driver Acquisition Process

Figure 5:
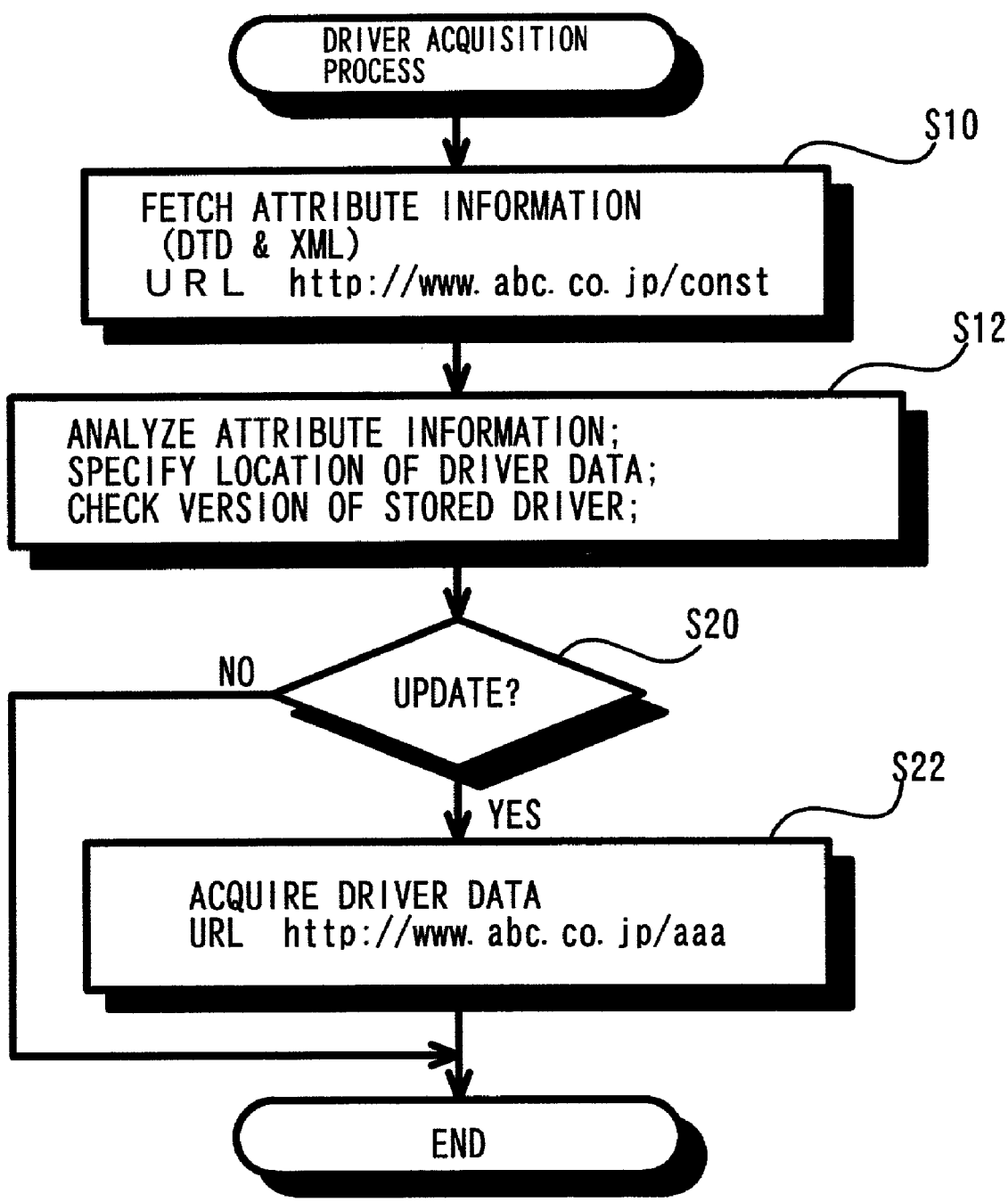
FIG. 5 is a flowchart showing a driver acquisition routine.

In the system configuration described above, the management system 10 acquires and downloads the printer driver from the Web server 100 according to the procedure discussed below. FIG. 5 is a flowchart showing a driver acquisition routine. This routine is executed by the management system 10. The management system 10 first fetches the attribute information (step S10). As described previously, the management system 10 is informed of the location of the attribute information in the Web server 100. As shown in FIG. 3, the URL of the attribute information is given as 'http://www.abc.co.jp/const'. The management system 10 gains access to this URL and downloads the attribute XML file and the attribute DTD file stored at the URL.

The management system 10 then analyzes the fetched attribute information (step S20). As described previously with FIG. 4, the management system 10 refers to the DTD and analyzes the details of the tags included in the fetched attribute information. The attribute information includes information regarding the location of the driver data, as well as information regarding the version of the printer driver, information regarding the installation method, and information regarding the platform. The management system 10 analyzes the attribute information to specify the location of the printer driver and determine whether or not the printer driver has been updated, that is, whether or not there is a printer driver of a later version than the version of the printer driver kept in the management system 10.

In the case where the printer driver has not yet been updated (step S20), there is no need of downloading. The management system 10 accordingly exits from the driver acquisition routine without any further processing. In the case where the printer driver has been updated (step S20), on the other hand, the management system 10 gains access to the location specified by the analysis at step S12 and downloads printer driver data (step S22). In the illustrated example of FIG. 3, the URL of the printer driver is specified as 'http://www.abc.co.jp/aaa'. The management system 10 thus accesses this URL and downloads the printer driver.

F. Driver Distribution Process

Figure 6:
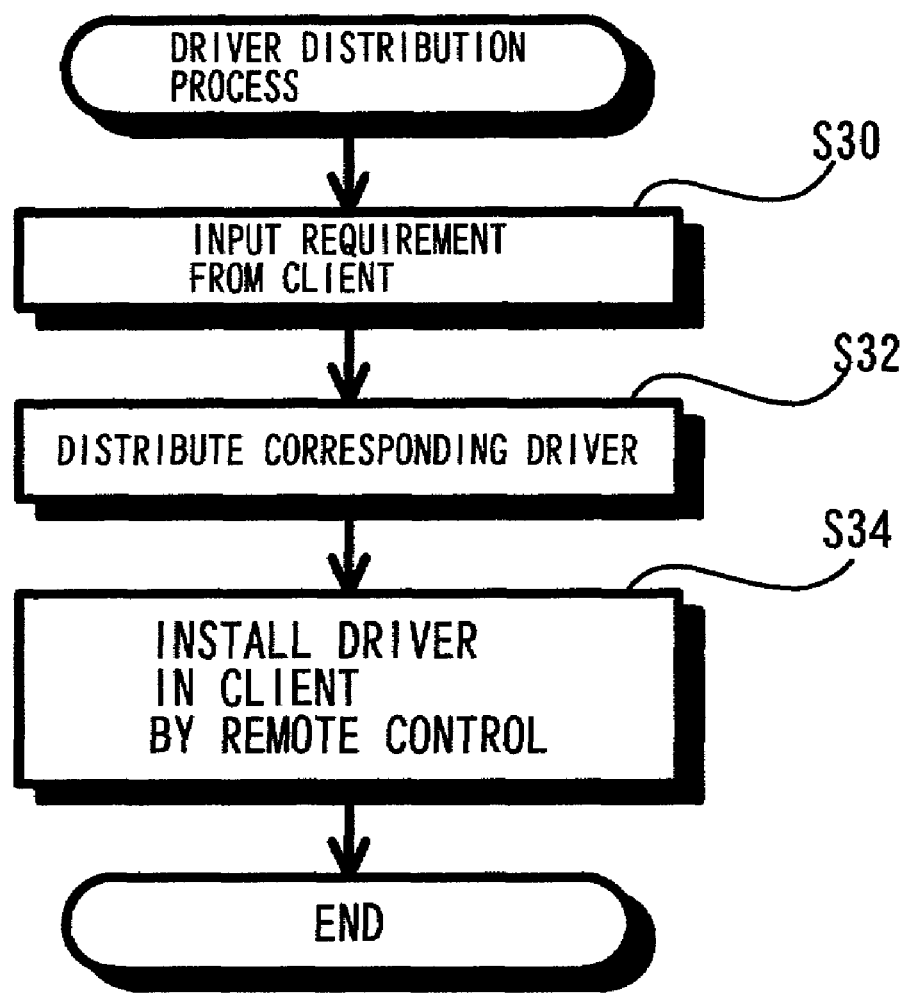
FIG. 6 is a flowchart showing a driver distribution routine.

The management system 10 distributes any of drivers stored therein to each client in response to a requirement. Distribution of the driver follows a procedure discussed below. FIG. 6 is a flowchart showing a driver distribution routine. This routine is executed by the management system 10. The management system 10 first receives a requirement from a client (step S30). The client gives a requirement that specifies a printer name desired for use. In the example of FIG. 1, the requirement specifies the printer name like 'PRT1' or 'PRT2'. The management system 10 manages the whole system on the network LAN and selects a driver corresponding to the desired printer name specified by the client and the client's platform. After selecting the adequate driver, the management system 10 distributes the selected driver to the client (step S32). The installation method is included in the attribute information of each printer driver. The management system 10 installs the driver in the client as the destination of distribution according to the installation method (step S34). In the case where an 'execution format file' to be executed for installation is specified, the execution format file distributed to the client is activated by remote control. This procedure installs the printer driver in the client and enables a printing operation to be performed with the specified printer.

The management system 10 of the embodiment discussed above downloads the printer driver from the Web server 100 and updates the printer driver to the latest version. This arrangement enables a desired printer driver to be readily acquired based on the attribute information provided by the Web server 100, even when the structure of the Web page that supplies the printer driver is complicated or changed by the respective manufacturers. This desirably relieves the load of the manager on the network LAN.

The arrangement of providing the attribute information on the Web server 100 ensures the flexible structure of the Web page on the Web server 100, while the management system 10 to readily download the printer driver. The application of the format XML having the high flexibility in definition of tags advantageously enables diverse attribute information to be readily described.

G. Second Embodiment

The first embodiment regards the system of facilitating acquisition of the printer driver from the fixed Web server 100 on the network. The second embodiment regards a system of facilitating acquisition of the printer driver, which is transferred from one Web server 100 to another Web server 100.

The whole system configuration of the second embodiment is identical with that of the first embodiment. The functional blocks of the management system 10 and the data stored in the Web server 100 are basically similar to those of the first embodiment. The differences from the first embodiment are that the attribute information fetching module 14 of the management system 10 has an additional function and that the attribute information stored in the Web server 100 has additional specifications in the second embodiment. Such addition in the second embodiment enables the printer driver to be readily acquired even when the printer driver is transferred from one Web server to another Web server.

Figure 7:
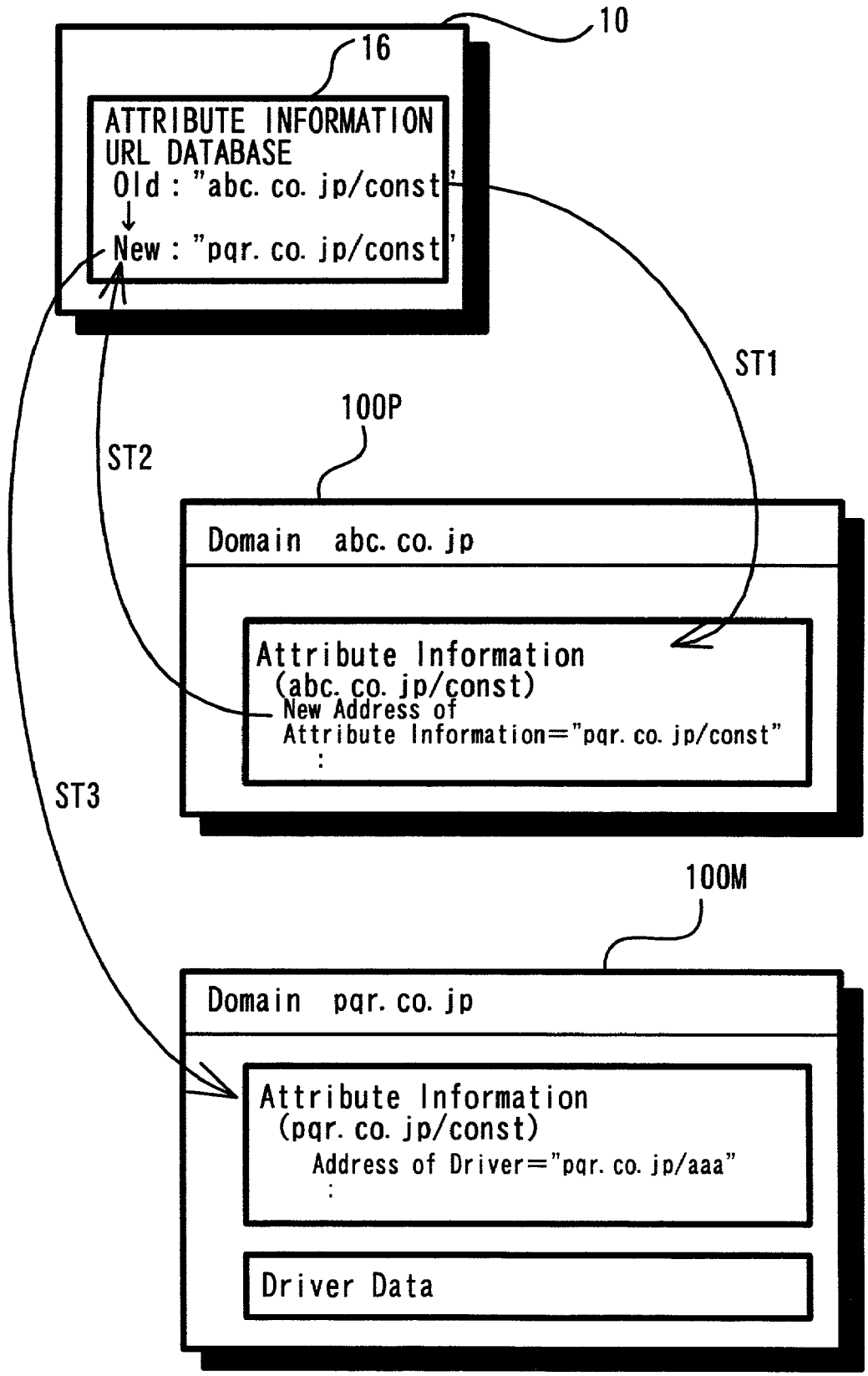
FIG. 7 shows data transmission when a driver is transferred from one server to another server in a second embodiment.

FIG. 7 shows data transmission when the printer driver is transferred from one server to another server in the second embodiment. In this illustrated example, the printer driver originally provided by a Web server 100P having the domain name 'abc.co.jp' is transferred to another Web server 100M having the domain name 'pqr.co.jp'. Both the servers 100P and 100M store the identical printer driver for a while after the transfer.

Under such circumstances, a 'new address of attribute information' is registered as the attribute information in the original Web server 100P prior to the transfer. Like the first embodiment, this information is described in an XML file and is defined as information on the new address by the DTD file. In the illustrated example, the location 'pqr.co.jp/const' of the attribute information in the Web server 100M is recorded as the information on the new address. In the case where the relation between the upper-most hierarchical level Web page and the location of the attribute information is fixed, that is, when the part corresponding to '/const' is fixed, the location of the attribute information is readily specified by the domain name of the new address. Only the domain name 'pqr.co.jp' of the Web server 100M may thus be recorded as the new address.

The management system 10 keeps the URL of attribute information, to which the attribute information URL database 16 should gain access first. The attribute information fetching module 14 in the management system 10 fetches the attribute information according to this URL. While the management system 10 does not recognize the transfer of the printer driver to another Web server, the old address of the attribute information prior to the transfer is kept as the URL. The management system 10 accordingly accesses the attribute information in the original Web server 100P as shown by an arrow ST1.

Data regarding the 'new address of attribute information' is written in the original Web server 100P as mentioned above. The management system 10 recognizes the transfer of the printer driver to another Web server by analyzing the attribute information in the Web server 100P and changes the information of the attribute information URL database 16 according to the 'new address of attribute information' (see an arrow ST2).

The management system 10 again accesses the attribute information based on the attribute information URL database 16. At this moment, the new address of the transferred attribute information is stored in the attribute information URL database 16. As shown by an arrow ST3, the management system 10 gains access to the transferred attribute information in the new Web server 100M. This attribute information includes data representing the location of driver data as discussed in the first embodiment. The management system 10 thus downloads the printer driver according to the procedure discussed in the first embodiment (see FIG. 5).

The attribute information URL database 16 of the management system 10 is updated by the above series of processing. After the update, the management system 10 does not gain access to the Web server 100P having the old address but directly accesses the Web server 100M having the new address. The Web server 100P is closed after some time elapses and there is no access to the Web server 100P. This ensures smooth transfer of the printer driver to a new server without causing any inconvenience to the users who receive the supply of the printer driver.

Figure 8:
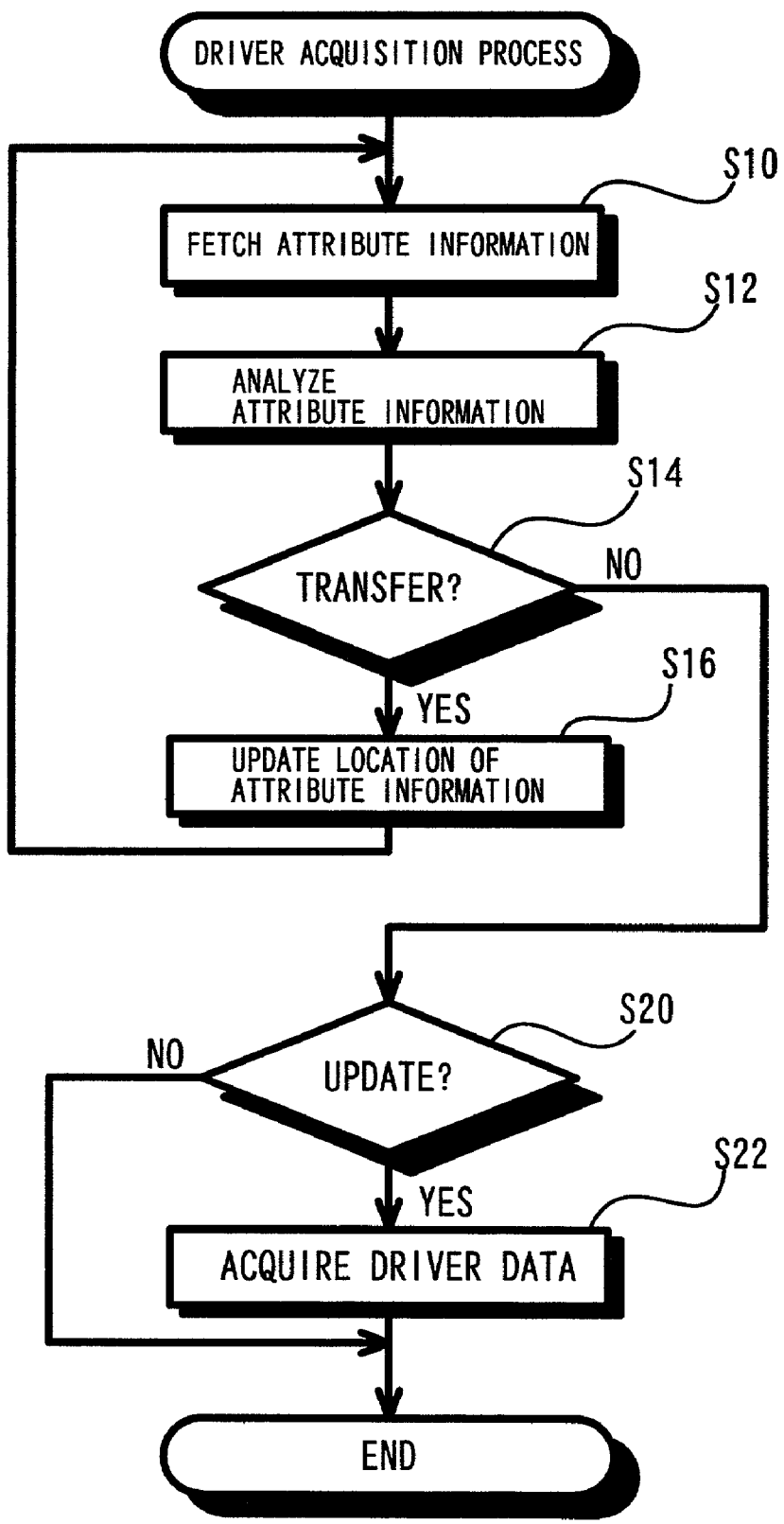
FIG. 8 is a flowchart showing a driver acquisition routine executed in the second embodiment.

The following series of processing is performed in the case of transfer of the printer driver to a new Web server. FIG. 8 is a flowchart showing a driver acquisition routine carried out in the second embodiment. This routine is executed by the management system 10. The management system 10 fetches the attribute information of a preset Web server (step S10) and analyzes the details of the attribute information (step S12) in the same manner as the first embodiment. As discussed previously with FIG. 7, at this moment, the management system 10 gains access to the original Web server 100.

The management system 10 then determines whether or not a transfer has occurred. (step S14). When the fetched attribute information includes the 'new address of attribute information', it is determined that there is a transfer. Otherwise it is determined that there is no transfer.

When it is determined that there is a transfer, the management system 10 updates the location of the attribute information to a new location based on the 'new address of attribute information' (step S16). The management system 10 then fetches and analyzes the updated attribute information (steps S10 and S12). When it is determined that there is another transfer, the process again updates the attribute information and carries out the above series of processing. The method of utilizing the 'new address of attribute information' well follows frequent transfer of the printer driver.

When it is determined at step S14 that there is no transfer, the process follows the same procedure as that of the first embodiment. When the fetched attribute information specifies the updated printer driver (step S20), the process downloads the driver data (step S22).

The system of the second embodiment ensures smooth transfer of the printer driver to a new Web server without causing any inconvenience with regard to supply of the printer driver, in addition to the advantages discussed in the first embodiment.

H. Modifications

The above embodiments regard the system of acquiring and distributing the printer driver. In general, the present invention provides a system for readily acquiring electronic contents including printer drivers. The technique of the present invention is applicable to diverse contents, for example, driver programs of various devices other than the printers. The target devices may be one type or a plurality of different types. For example, the technique of the present invention may be applied to download a printer driver and a scanner driver from a Web server. In such cases, the type of the target device driver should be included in the attribute information. The effective use of the attribute information ensures easy and accurate acquisition of adequate contents even when there are contents of different applications and details in an identical format. The contents may include firmware of various devices other than the drivers, as well as diverse application programs. The contents are not restricted to the software but may be data of letters and images, for example, help files.

The above embodiments regard the case of downloading the contents from the Web server on the Internet. The technique of the present invention is, however, not restricted to the system constructed on the Internet, but may be applicable to a system that is constructed on an Intranet and includes both a management system and a Web server. For example, diverse inside software packages, technical documents, and manuals may be stored as contents in the Web server. Especially the arrangement of storing software packages in the server and describing conditions of their utilization in the XML file facilitates effective use of the inside software resources and is thus extremely efficient.

The present invention is not restricted to the above embodiments or their modifications, but there may be many other modifications, changes, and alterations without departing from the scope or spirit of the main characteristics of the present invention. In the above embodiments, the management system 10 is actualized by one general-purpose computer. The functional blocks shown in FIG. 2 may alternatively be attained in a distributive manner by multiple computers working in cooperation.

What is claimed is:

1. A support system that assists a client connecting with a network to collect a predetermined program operating on the client via the network, said support system comprising:
   an attribute information providing module that is present at a known location to the client on the network and provides attribute information, which includes information regarding an address of the program operating on the client on the network and a utilization method of the program operating on the client,
   wherein the attribute information includes new address information for specifying a new address of said attribute information providing module at the known location and replacement instruction information that instructs replacement of data in the client with regard to the location of said attribute information providing module with the new address information, wherein the attribute information, new address information, and replacement instruction information are all included in the same file that is regularly monitored by said system,
   wherein said system further comprises a replacing module that replaces the data with regard to the location of said attribute information server with the new address information when the attribute information is fetched and the attribute information includes the replacement instruction information.

2. A support system in accordance with claim 1, wherein the attribute information is described in an SGML language with a tag.

3. A support system in accordance with claim 2, wherein the attribute information includes attribute description data that utilizes the tag to describe an attribute and tag definition data that defines details of the tag used for the description.

4. A support system in accordance with claim 1, wherein the program is a driver program of a predetermined device.

5. An information collection system that collects a predetermined electronic program operating on a client from a server connecting with a network, said information collection system comprising:
   an attribute information fetching module that fetches attribute information, which includes information regarding an address of the predetermined program operating on the client on the network and a utilization method of the program operating on the client, from an attribute information server that is present at a known location on the network;
   an address specification module that analyzes the attribute information and specifies the address of the predetermined program; and
   a collection module that gains access to the specified address and thereby collects the predetermined program,
   wherein the attribute information includes new address information for specifying a new address of said attribute information providing module at the known location and replacement instruction information that instructs replacement of data in the client with regard to the location of said attribute information server with the new address information, wherein the attribute information, new address information, and replacement instruction information are all included in the same file that is regularly monitored by said system, and
   wherein the system further comprises a replacing module for replacing the data with regard to the location of said attribute information server with the new address information when the attribute information is fetched and the attribute information includes the replacement instruction information.

6. An information collection system in accordance with claim 5, said information collection system further comprising:
   an updating module that activates said collection module to collect the predetermined program, when a specified condition with regard to update of the server that provides the predetermined program is fulfilled.

7. An information collection system in accordance with claim 5, said information collection system further comprising:
   a replacement module that, when the attribute information includes new address information for specifying a new address of said attribute information server and instruction information that instructs replacement of data with regard to the location of said attribute information server with the new address information, replaces data with regard to the location of said attribute information server with the new address information based on the attribute information.

8. An information collection system in accordance with claim 5, said information collection system further comprising:
   a storage module that stores the collected program; and
   a distribution module that receives a requirement from the client connecting with the network and distributes a corresponding program to the client in response to the requirement.

9. An information collection system in accordance with claim 8, wherein the program is a driver program of a predetermined device,
   the attribute information includes information regarding an installation method of the driver program, and
   said distribution module installs the driver program into the client connecting with the network according to the installation method.

10. A support method that assists a client connecting with a network to collect a predetermined program operating on the client via the network, said method comprising the step of:
    storing attribute information, which includes an address of the program operating on the client on the network, and information regarding a utilization method of the program operating on the client, at a known location to the client on the network, thereby assisting the client to access the program,
    as the attribute information, receiving new address information for specifying a new address of said known location at which the attribute information is stored and instruction information that instructs replacement of data in the client with regard to the location of said attribute information server with the new address information, wherein the attribute information, new address information, and replacement instruction information are all included in the same file that is regularly monitored by said system, and replacing the location of said attribute information with the new address based on the instruction information when the attribute information is fetched and the attribute information includes the instruction information.

11. A method of collecting a predetermined electronic program operating on a client from a server connecting with a network, said method comprising the steps of:
 (a) gaining access to a preset location on the network and fetching attribute information that is stored at the preset location and includes information regarding an address of the predetermined program operating on the client on the network, and information regarding a utilization method of the program operating on the client;
 (b) analyzing the attribute information and specifying the address of the predetermined program; and
 (c) accessing the specified address to collect the program,
 wherein the attribute information includes new address information for specifying a new address of said known location at which the attribute information is stored and instruction information that instructs replacement of data in the client with regard to the location of said attribute information server with the new address information, wherein the attribute information, new address information, and replacement instruction information are all included in the same file that is regularly monitored by said system, and
 wherein the method further comprises
 (d) the step of replacing the location of said attribute information with the new address based on the instruction information included in the received attribute information when the attribute information is fetched and the attribute information includes the instruction information.

12. A recording medium, in which a program for collecting a predetermined electronic program operating on a client from a server connecting with a network is recorded in a computer readable manner, said program causing a computer to attain the functions of:
 fetching attribute information, which includes information with regard to an address of the predetermined program operating on the client on the network, and information regarding a utilization method of the program operating on the client, from a preset location on the network;
 analyzing the attribute information and specifying the address of the program; and
 collecting the program from the specified address,
 wherein the attribute information includes new address information for specifying a new address of said known location at which the attribute information is stored and instruction information that instructs replacement of data in the client with regard to the location of said attribute information server with the new address information, wherein the attribute information, new address information, and replacement instruction information are all included in the same file that is regularly monitored by said system, and
 wherein said program further causes the computer to attain the function of
 replacing the location of said attribute information with the new address based on the instruction information included in the received attribute information when the attribute information is fetched and the attribute information includes the instruction information.

\* \* \* \* \*